United States Patent
Harada (10) Patent No.: US 9,298,992 B2
(45) Date of Patent: Mar. 29, 2016

(54) GEOGRAPHIC FEATURE-BASED LOCALIZATION WITH FEATURE WEIGHTING

(71) Applicant: Toyota Motor Engineering & Manufacturing North America, Inc., Erlanger, KY (US)

(72) Inventor: Masahiro Harada, Novi, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 74 days.

(21) Appl. No.: 14/185,391

(22) Filed: Feb. 20, 2014

(65) Prior Publication Data

US 2015/0233720 A1      Aug. 20, 2015

(51) Int. Cl.
  G01C 21/12      (2006.01)
  G06K 9/00       (2006.01)
  G01C 21/30      (2006.01)

(52) U.S. Cl.
  CPC ............ G06K 9/00791 (2013.01); G01C 21/30 (2013.01); G06K 9/00523 (2013.01); G06T 2207/30252 (2013.01)

(58) Field of Classification Search
  USPC .......................................... 701/409; 382/183
  See application file for complete search history.

(56) References Cited

U.S. PATENT DOCUMENTS

| | | | |
|---|---|---|---|
| 6,429,789 B1 * | 8/2002 | Kiridena et al. | 340/905 |
| 6,853,906 B1 * | 2/2005 | Michi et al. | 701/521 |
| 8,478,493 B2 * | 7/2013 | Anderson | 701/50 |
| 2008/0033645 A1 * | 2/2008 | Levinson et al. | 701/213 |
| 2008/0040029 A1 * | 2/2008 | Breed | 701/208 |
| 2010/0098295 A1 * | 4/2010 | Zhang et al. | 382/103 |
| 2012/0310516 A1 * | 12/2012 | Zeng | 701/300 |
| 2013/0158865 A1 | 6/2013 | Na et al. | |
| 2014/0019005 A1 * | 1/2014 | Lee et al. | 701/36 |
| 2014/0032108 A1 * | 1/2014 | Zeng et al. | 701/533 |

OTHER PUBLICATIONS

Levinson et al., "Map-based precision vehicle localization in urban environments", 2007, Robotics: Science and Systems Conference in 7 pages.

Levinson et al. "Robust vehicle localization in urban environments using probabilistic maps", 2010, Robotics and Automation (ICRA) in 8 pages.

* cited by examiner

*Primary Examiner* — Thomas G Black
*Assistant Examiner* — Tyler Paige
(74) *Attorney, Agent, or Firm* — Christopher G. Darrow; Darrow Mustafa PC

(57) ABSTRACT

A system, device, and methods for autonomous navigation using geographic feature-based localization. An example method includes identifying one or more geographic features based on information received from one or more sensors disposed on a vehicle as the vehicle traverses a route and associating one of a horizontal space and a vertical space with each of the one or more geographic features. The example method further includes comparing the one or more geographic features to a geographic feature map and generating a localized vehicle position based on the comparison between the one or more geographic features and the geographic feature map. Comparing the one or more geographic features to the geographic feature map can include applying weights to the one or more geographic features based in part on the space association for each of the one or more geographic features.

20 Claims, 4 Drawing Sheets

GEOGRAPHIC FEATURE-BASED LOCALIZATION WITH FEATURE WEIGHTING

BACKGROUND

Highly automated driving systems are designed to operate a vehicle on the road without driver interaction or other external control, for example, self-driving vehicles or autonomous vehicles. It is desirable that a navigation system for an autonomous vehicle be able to determine the location of the vehicle with a sufficient degree of accuracy. Calculating a precise physical position for the vehicle in respect to a representation of its surroundings can be referred to as localization. Localization can be performed for autonomous vehicles by comparing a representation of the current position of the vehicle in respect to various types of geographic features to a representation of the same geographic features recorded on a detailed virtual map.

SUMMARY

A system, device, and methods for geographic feature-based localization of autonomous vehicles are disclosed. Various geographic features can be identified while a vehicle travels a previously mapped route. These geographic features can be associated with a horizontal space, such as the ground plane, or a vertical space, such as the physical space above the ground plane, and then compared to geographic features present within a geographic feature map of the route. Matches made during the map comparison in order to localize the vehicle position can be weighted, at least in part, based on the space association of the relevant geographic feature being compared in order to account for a variety of environmental conditions that may affect the matching process. These environmental conditions can include, for example, weather conditions and road construction.

In one implementation, an automated driving system is disclosed. The system includes one or more sensors disposed on a vehicle and a computing device in communication with the one or more sensors. The computing device includes one or more processors for controlling the operations of the computing device and a memory for storing data and program instructions used by the one or more processors. The one or more processors are configured to execute instructions stored in the memory to identify one or more geographic features based on information received from the one or more sensors as the vehicle traverses a route and associate one of a horizontal space and a vertical space with each of the one or more geographic features. The processors are further configured to compare the one or more geographic features to a geographic feature map and generate a localized vehicle position based on the comparison between the one or more geographic features and the geographic feature map. The comparison of the one or more geographic features to the geographic feature map can include applying weights to the one or more geographic features based in part on the space association for each of the one or more geographic features.

In another implementation, a computer-implemented method of automated driving is disclosed. The method includes identifying one or more geographic features based on information received from one or more sensors disposed on a vehicle as the vehicle traverses a route and associating one of a horizontal space and a vertical space with each of the one or more geographic features. The method further includes comparing the one or more geographic features to a geographic feature map and generating a localized vehicle position based on the comparison between the one or more geographic features and the geographic feature map. Comparing the one or more geographic features to the geographic feature map can include applying weights to the one or more geographic features based in part on the space association for each of the one or more geographic features.

In another implementation, a computing device is disclosed. The computing device includes one or more processors for controlling the operations of the computing device and a memory for storing data and program instructions used by the one or more processors. The one or more processors are configured to execute instructions stored in the memory to identify one or more geographic features based on information received from one or more sensors disposed on a vehicle as the vehicle traverses a route and associate one of a horizontal space and a vertical space with each of the one or more geographic features. The one or more processors are further configured to compare the one or more geographic features to a geographic feature map and generate a localized vehicle position based on the comparison between the one or more geographic features and the geographic feature map. The comparison of the one or more geographic features to the geographic feature map can include applying weights to the one or more geographic features based in part on the space association for each of the one or more geographic features.

BRIEF DESCRIPTION OF THE DRAWINGS

The description makes reference to the accompanying drawings wherein like reference numerals refer to like parts throughout the several views, and wherein.

DETAILED DESCRIPTION

Geographic feature-based localization of an autonomous vehicle is described here. One example method of localizing a vehicle position includes identifying geographic features while a vehicle traverses a route and associating one of a horizontal space and a vertical space with each of the geographic features. The example method further includes comparing the geographic features to a previously generated geographic feature map of the same route and generating a localized vehicle position based on the comparison between the geographic features and the geographic feature map. Comparing the currently captured geographic features to the geographic feature map can include applying weights to the geographic features based in part on the space association for the geographic features, for example, to account for changes in external environmental conditions since the geographic feature map was generated. These external environmental conditions can include weather-based and construction-based conditions.

Figure 1:
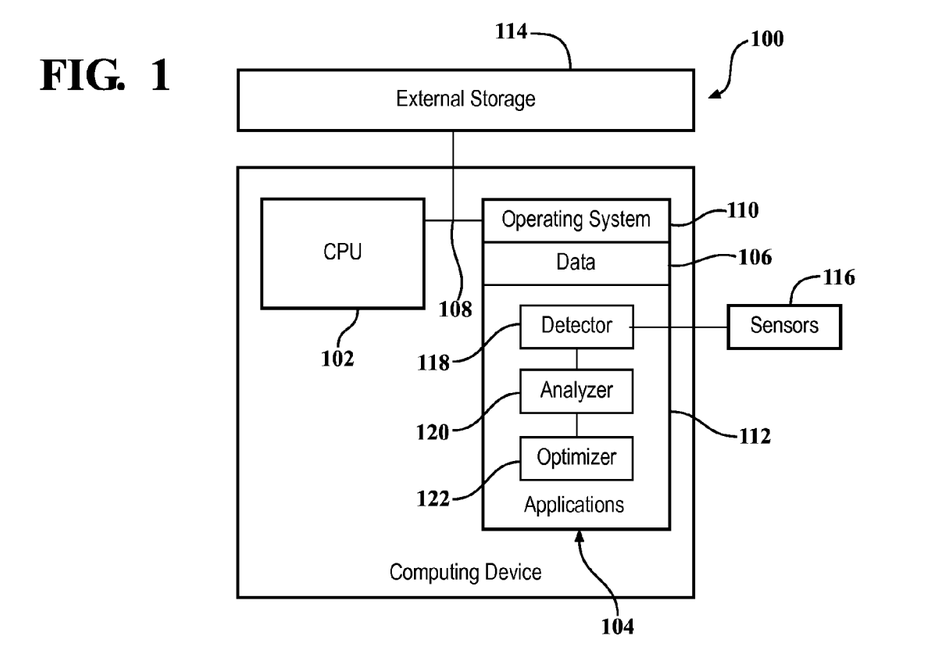
FIG. 1 is a block diagram of a computing device.

FIG. 1 is a block diagram of a computing device 100. The computing device 100 can be any type of vehicle-installed, handheld, desktop, or other form of single computing device, or can be composed of multiple computing devices. The CPU 102 in the computing device 100 can be a conventional central processing unit or any other type of device, or multiple devices, capable of manipulating or processing information. The memory 104 in the computing device 100 can be a random access memory device (RAM) or any other suitable type of storage device. The memory 104 can include data 106 that is accessed by the CPU 102 using a bus 108. The memory 104 can also include an operating system 110 and installed applications 112, the installed applications 112 including programs that permit the CPU 102 to perform the geographic feature-based localization methods described here.

The computing device 100 can also include additional or secondary storage 114, for example, a memory card, flash drive, or any other form of computer readable medium. The installed applications 112 can be stored in whole or in part in the secondary storage 114 and loaded into the memory 104 as needed for processing. The computing device 100 can also include, or be coupled to, one or more sensors 116. The sensors 116 can capture data and/or signals for processing by an inertial measurement unit (IMU), a dead-reckoning system, a global navigation satellite system (GNSS), a light detection and ranging (LIDAR) system, a radar system, a sonar system, an image-based sensor system, or any other type of system capable of capturing information specific to the environment surrounding a vehicle, including information specific to objects such as other vehicles proximate to the navigation route of the vehicle, pedestrians, geographic features of the route being traveled by the vehicle, or other localized position data and/or signals and outputting corresponding data and/or signals to the CPU 102.

The sensors 116 can also capture data representative of changes in x, y, and z-axis position, velocity, acceleration, rotation angle, and rotational angular rate for the vehicle. If the sensors 116 capture data for a dead-reckoning system, data relating to wheel revolution speeds, travel distance, steering angle, and steering angular rate of change can be captured. If the sensors 116 capture signals for a GNSS, a receiver can calculate the vehicle position and the vehicle velocity estimated in global coordinates. A plurality of satellites can be used to estimate the vehicle's position and velocity using three-dimensional triangulation and time estimation.

If the sensors 116 capture data for a LIDAR system, ranging data relating to intensity or reflectivity returns of the environment surrounding the vehicle can be captured. In the examples described below, the sensors 116 can capture, at least: data for a dead-reckoning system or other system that estimates vehicle velocity, acceleration, deceleration, position, and orientation; signals for a GNSS or other system that determines vehicle position and velocity; and data for a LIDAR system or other system that measures vehicle distance from geographic features, obstacles, or objects along a navigation route being traversed by the vehicle. In the example computing device 100 described in FIG. 1, the applications 112 stored in the memory 104 include at least a feature detector 118, a feature analyzer 120, and a vehicle position optimizer 122. Each of these applications 112 are described in additional detail below. In general, data captured by the sensors 116 can be used by one or more of these applications 112 to understand the environment surrounding the vehicle and improve the positional accuracy of the vehicle.

Figure 2:
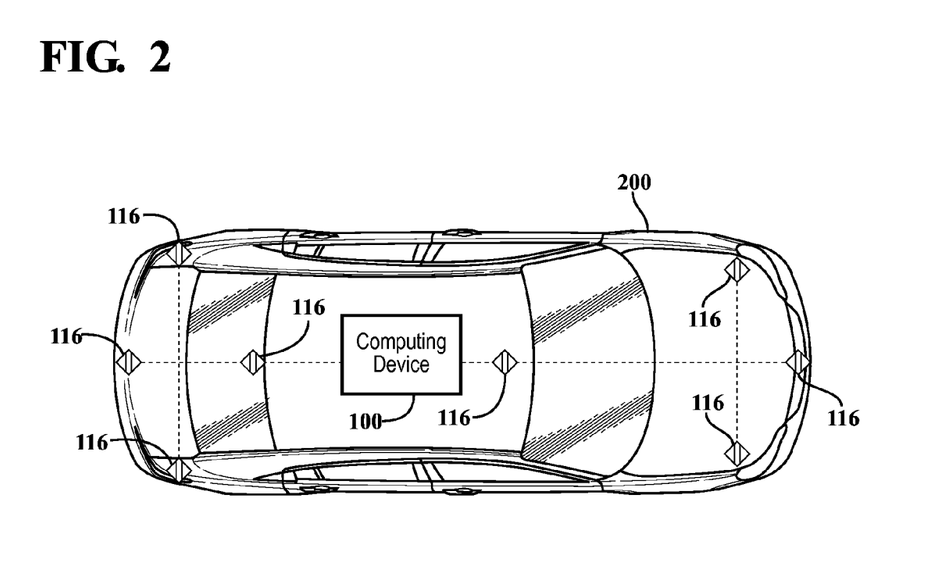
FIG. 2 shows a schematic of a vehicle including the computing device of FIG. 1.

FIG. 2 shows a schematic of a vehicle 200 including the computing device 100 described in FIG. 1. The computing device 100 can be located within the vehicle 200 as shown in FIG. 2 or can be located remotely from the vehicle 200 in an alternate location (not shown). If the computing device 100 is located remotely from the vehicle 200, the vehicle 200 can include the capability of communicating with the computing device 100.

The vehicle 200 can also include a plurality of sensors, such as the sensors 116 described in reference to FIG. 1. One or more of the sensors 116 shown can be configured to capture changes in velocity, acceleration, wheel revolution speed, and distance to objects or geographic features within the surrounding environment for use by the computing device 100 to estimate the position and orientation of the vehicle 200 in respect to the objects or geographic features, the steering angle for a dead-reckoning system, images for processing by an image sensor, the vehicle position in global coordinates based on signals from a plurality of satellites, or any other data and/or signals that could be used to determine the current state of the vehicle 200 or determine the position of the vehicle 200 in respect to its environment.

For example, if the sensors 116 are configured to capture data for use by a LIDAR system, the sensors 116 can capture data related to laser returns from physical objects in the area surrounding the vehicle 200. One of the applications 112 in the computing device 100, for example, the feature detector 118, can then calculate ranging distances to various objects or geographic features in the area surrounding the vehicle 200 by measuring the time it takes for a signal to return to the sensor 116. Laser returns can include the backscattered light reflected by objects or other geographic features hit by a source of light, e.g. laser light, being emitted by the sensors 116 or another source on or proximate to the vehicle 200. This backscattered light can be measured in the form of intensity values, these intensity values being associated with the geographic features being identified by the feature detector 118.

The feature detector 118 can also communicate with other applications 112 in the computing device 100, for example, the feature analyzer 120. The feature analyzer 120 can be configured to analyze data and/or signals by, for example, filtering noise, determining the shape associated with various detected geographic features, determining a geophysical location associated with various detected geographic features, and classifying geographic features within a physical space such as a horizontal space or vertical space. The feature analyzer 120 can also be configured to communicate with other applications 112 used to implement the automated driving system, such as the vehicle position optimizer 122 as further described below.

Figure 3:
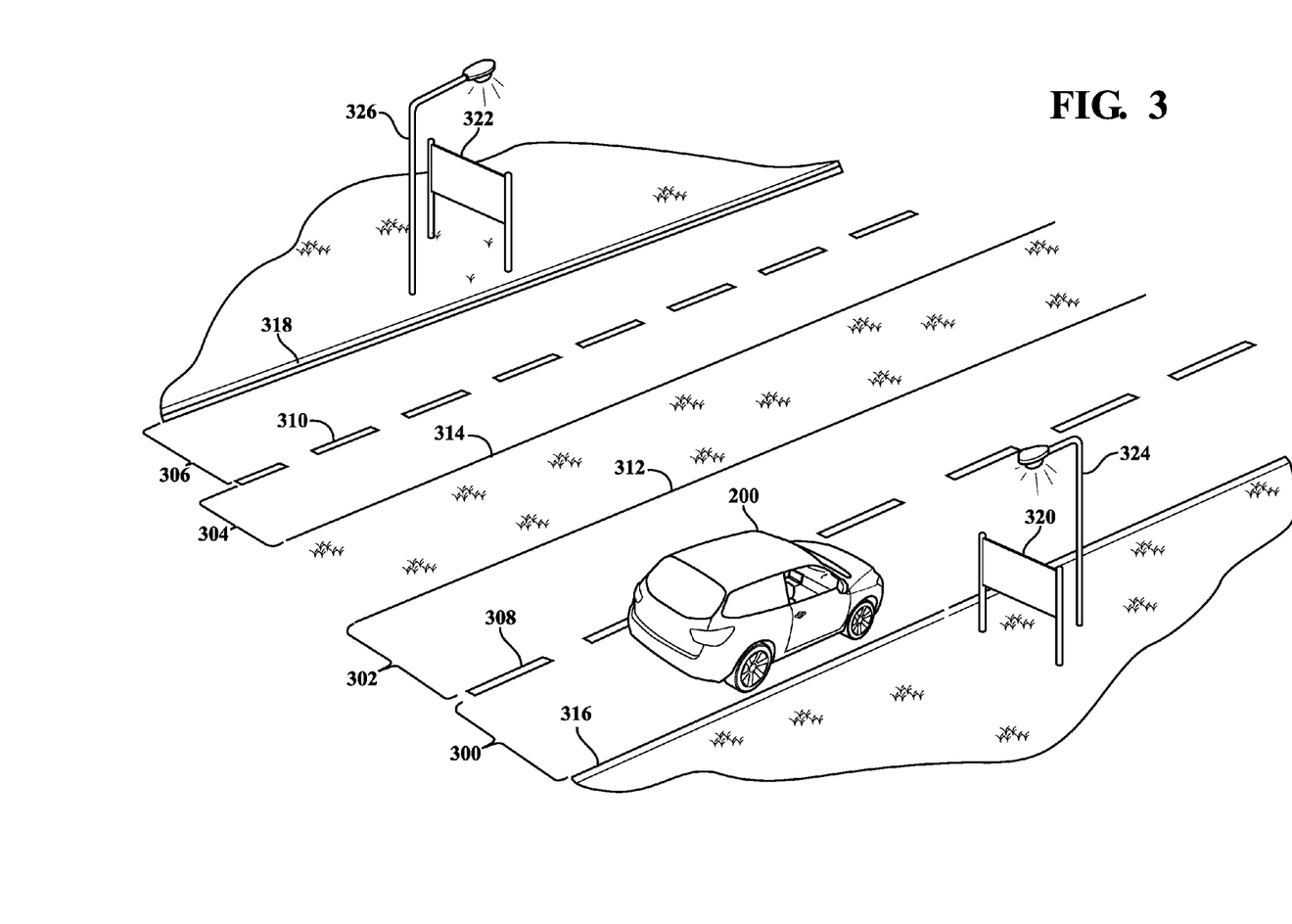
FIG. 3 shows a perspective view of the vehicle of FIG. 2 traversing a portion of an example route including a variety of geographic features.

FIG. 3 shows a perspective view of the vehicle 200 of FIG. 2 traversing a portion of an example route including a variety of geographic features. The example route portion includes four distinct lanes 300, 302, 304, 306, with the vehicle 200 traveling within the lane 300. Each of the lanes 300, 302, 304, 306 can be defined by a variety of boundaries, these boundaries serving as the geographic features. The boundaries in this example include lane markings, such as center lines 308, 310 and edge lines 312, 314, and lane edge features, such as curbs 316, 318. For example, lane 300 extends between curb 316 and center line 308 and lane 304 extends between edge line 314 and center line 310. The lane markings and lane edge features can each be associated with a horizontal space by the feature analyzer 120. That is, the lane markings and lane edge features are generally located along a ground plane within the physical environment, and can thus be categorized by the feature analyzer 120 as horizontal space geographic features.

The example route portion in FIG. 3 also includes various geographic features that can be associated by the feature analyzer 120 with a vertical space, that is, geographic features that extend above the ground plane in the environment surrounding the vehicle 200. Examples of geographic features that can be associated with a vertical space include signs, poles, buildings, and trees. In FIG. 3, street sign 320 and street sign 322 are located adjacent to lane 300 and lane 306, respectively. Additionally, lamp pole 324 and lamp pole 326 are located adjacent to street sign 320 and street sign 322, respectively. Each of the geographic features, including the lane markings, lane edge features, signs, and poles shown in the example route portion in FIG. 3, were first identified by the feature detector 118 after data related to each of these geographic features was captured by one or more of the various sensors 116 as described above in regards to FIG. 2.

In addition to being identified by the feature detector 118 and associated with either a vertical space or a horizontal space by the feature analyzer 120, the geographic features can be associated with a geophysical location by the feature analyzer 120, for example, for later comparison to a geographic feature map that includes the geophysical location of each of the geographic features. Additionally, each of the geographic features can be associated with a shape for later comparison to a geographic feature map. For example, lane markings can be associated with a line shape (e.g. edge lines 312, 314), lane edge features can be associated with interruptions in a line shape (e.g. curbs 316, 318), sign features can be associated with a plane shape (e.g. street signs 320, 322), and pole features can be associated with a cylindrical shape (e.g. lamp poles 324, 326).

Thus, each of the geographic features can be associated with various characteristics that describe the geographic feature in a unique way: intensity values, geophysical location, space association (e.g. horizontal space and vertical space), and shape association (e.g. lines, planes, and cylinders). Associating each of the geographic features with these characteristics allows for a more robust approach of mapping and localization. For example, different characteristics of a geographic feature can be useful in determining whether to apply an increased or decreased weight to the geographic feature when different conditions are present in the physical environment than were previously recorded on a geographic feature map. Use of the various characteristics of the geographic features for comparison to a geometric feature map and for improved localization of the vehicle 200 is further described below.

Figure 4A:
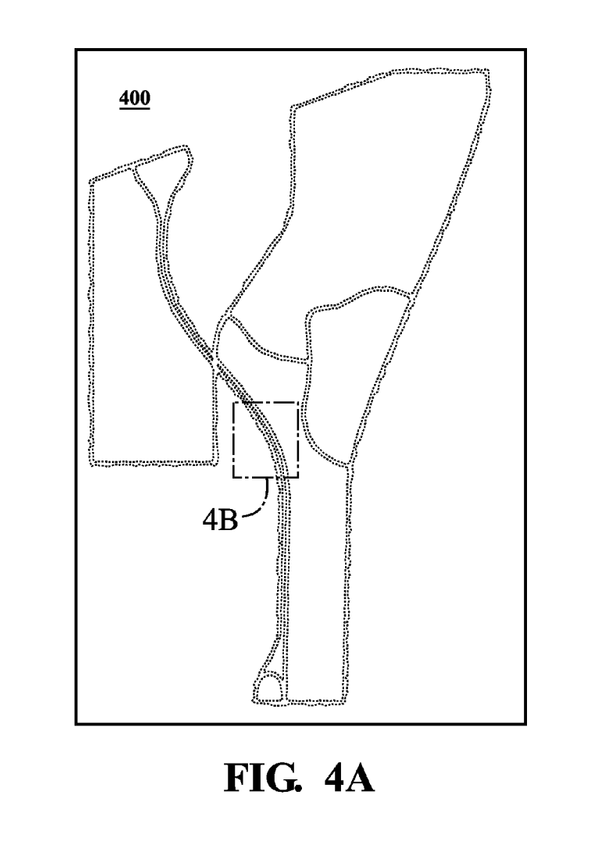
FIG. 4A shows an example two-dimensional representation of a geographic feature map including the portion of the example route shown in FIG. 3.

FIG. 4A shows an example two-dimensional representation of a geographic feature map 400 including the portion of the example route shown in FIG. 3. The portion of the example route shown in FIG. 3 is also further described in respect to FIG. 4B. The geographic feature map 400 in this example is currently displaying intensity return data, e.g. intensity values, as associated with various geographic features. In another example, some of the geographic features used to construct the geographic feature map 400 can be detected based on the shape of the geographic feature (e.g. a line, plane, or cylinder). Additionally, the detected geographic features can be projected to global coordinates and associated with a geophysical location. Each of the detected geographic features can also be associated with either a horizontal space or a vertical space.

The detection of intensity values, geophysical locations, shapes, and spaces can be spread over multiple data runs, that is, multiple traversals of the route, with the sensors 116 capturing data during each data run. The data captured during the multiple runs can be combined and processed, for example, using a simultaneous mapping and localization routine (SLAM) to smooth the overlap between the various runs. In addition, the geographic feature map 400 can be processed to remove any associations with locations, shapes, spaces, or intensity values that represent obstacles, such as other vehicles, people, or animals captured during one of the runs that would not normally be present along the route.

The resulting geographic feature map 400, comprised of geographic features associated with intensity values, geophysical location, space, and/or shape, can be used to assist in localizing the vehicle 200 during subsequent autonomous navigation of the route. Further, this type of geographic feature map 400 can be stored and used by the various applications 112 of the computing device 100 without expending too many resources, since the map is compact and can be configured to contain only information related to the geographic features. A detailed view of the geographic feature map 400 of FIG. 4A including representations of intensity values and shapes is shown in FIG. 4B.

Figure 4B:
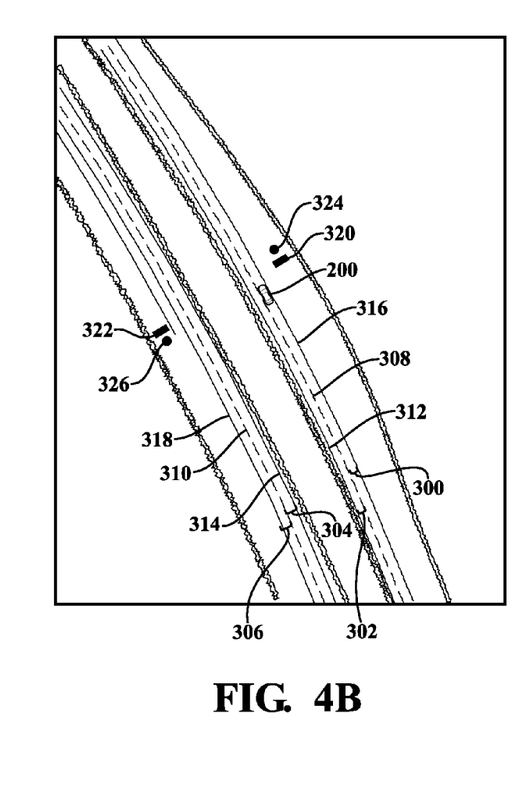
FIG. 4B shows an exploded view of the geographic feature map of FIG. 4A highlighting the portion of the example route shown in FIG. 3.

FIG. 4B shows an exploded view of the geographic feature map 400 of FIG. 4A highlighting the portion of the example route shown in FIG. 3. This view is a top view of the lanes 300, 302, 304, 306. In the top view, horizontal space features such as the center lines 308, 310, the edge lines 312, 314, and the curbs 316, 318 are represented by intensity values and line shapes and vertical space geographic features such as the street signs 320, 322 are represented by plane shapes, or in the case of this top view, rectangular shapes. Similarly, vertical space geographic features such as the lamp poles 324, 326 are represented in the shapes of cylinders, or in the case of this top view, circles. This example exploded view of the geographic feature map 400 also includes some fuzzier lines indicative of intensity values captured from the central berm between the lanes 302, 304 and the far edges of, for example, the grass surface beyond the street signs 320, 322. Though shown here using intensity values, these geographic features representative of the berm and grass clusters can be stripped from the geographic feature map 400 if they are not useful for later comparison purposes. In some locations along the route where lane markings or lane edge features are not present, the intensity values representing the edge of the grass or the berm between lanes may serve as the reference horizontal geographic features.

Figure 5:
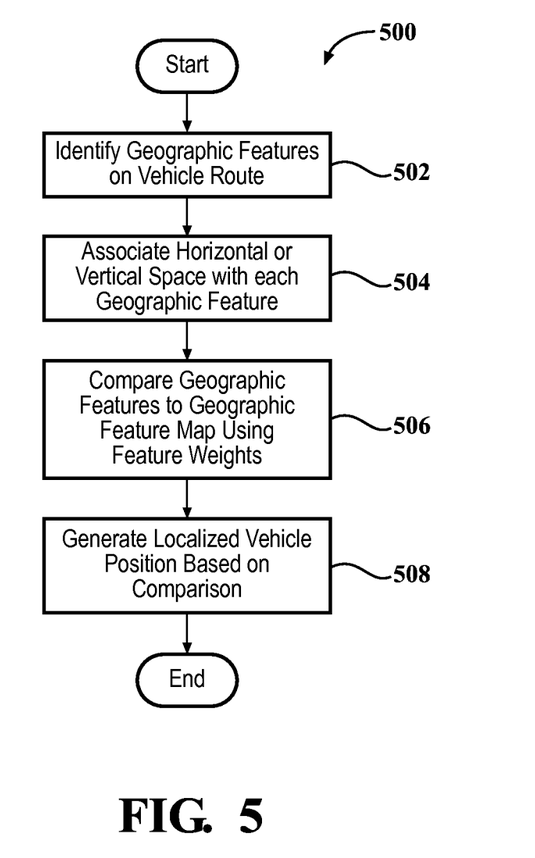
FIG. 5 shows an example process for automated driving using geographic feature-based localization.

FIG. 5 shows an example process 500 for automated driving using geographic feature-based localization. The operations described in connection with the process 500 can be performed at the computing device 100, for example, using the feature detector 118, feature analyzer 120, and vehicle position optimizer 122 applications. The operations described in connection with the process 500 can also be embodied as a non-transitory computer readable storage medium including program instructions executable by one or more processors that, when executed, cause the one or more processors to perform the operations. For example, the operations described in connection with the process 500 can be stored in the memory 104 of the computing device 100 and can be executable by the CPU 102.

At operation 502, one or more geographic features are identified based on information received from the one or more sensors 116 as the vehicle 200 traverses a route. As described above, the feature detector 118 can receive data from the one or more sensors 116 and the feature analyzer 120 can identify various geographic features based on groupings of intensity values or associations with shapes or spaces. For example, while the vehicle 200 is traveling along a portion of a previously mapped route as shown in FIG. 3, the sensors 116 can capture intensity returns, images, or other data that can be processed by the feature detector 118 and/or feature analyzer 120 in order to identify the following geographic features:

center lines 308, 310, edge lines 312, 314, curbs 316, 318, street signs 320, 322, and lamp poles 324, 326. In some examples, the geographic features are associated with intensity values. In other examples, the geographic features are associated with shapes, the shapes including lines, planes, and cylinders. In other examples, the geographic features are identified by their geophysical location.

At operation 504, each of the geographic features can be associated with either a horizontal space or a vertical space. For example, geographic features identified as lane markings, such as center lines 308, 310 and edge lines 312, 314, and lane edge features, such as curbs 316, 318, can be associated with a horizontal space. That is, these geographic features can be associated with the physical space along the ground plane proximate to the vehicle 200. In another example, geographic features identified as signs, poles, buildings, or trees, such as street signs 320, 322 and lamp poles 324, 326 can be associated with a vertical space. That is, these geographic features can be associated with the physical space above the ground plane proximate to the vehicle 200. By associating each of the geographic features with a space, in addition to various associations with shape, intensity value, or geophysical location, the geographic features can more easily be weighted in the upcoming comparison step to account for changes in environmental conditions.

At operation 506, the geographic features identified and associated with either a vertical space or horizontal space can be compared to a geographic feature map. For example, the feature analyzer 120 can compare a detected and identified geographic feature, based on its associated intensity values, shape, space, and/or geophysical location to the various geographic features present in a geographic feature map to determine whether a match is present. A match is present, for example, if there is a distance between the geographic features less than a given threshold (e.g. based on geophysical location) and the features have similar feature properties (e.g. intensity values, shape, and/or space). To make the comparison more efficient, either the latest localized vehicle position or the vehicle position based on information collected by a GNSS if no localized vehicle position is available can be used to limit the search comparison area within the geographic feature map.

Using FIGS. 3 and 4B as examples of a current vehicle position and a portion of the geographic feature map 400 for comparison purposes, street sign 322 can be identified by the feature detector 118 and associated with a vertical space, plane shape, geophysical location, and set of intensity values by the feature analyzer 120. The vehicle position optimizer 122 can compare the street sign's 322 currently captured attributes of a planar shape in the vertical space at a given geophysical location to various geographic features within the geographic feature map 400. A match can be found in street sign 322 as shown in FIG. 4B since this geographic feature has the same geophysical position, planar association, and vertical space association. A similar comparison can be made, for example, for center lines 308, 310, edge lines 312, 314, and curbs 316, 318. These geographic features are all associated with a horizontal space, linear shape, and relative geophysical position and intensity values.

In addition to using the direct comparison between geographic features captured during a vehicle's current travel along a route to geographic features associated with a geographic feature map, operation 506 can include applying weights to the geographic feature comparison based at least in part on the space association for the geographic features. Using weights based at least in part on the space association allows the comparison to account for various environmental conditions that can adversely affect the match to be made between a currently captured geographic feature and one stored in a geographic feature map. For example, rainy and snowy conditions can obscure horizontal space geographic features such as lane markings, but may not affect other horizontal space geographic features, such as curbs. Further, vertical space features such as signs or poles would not usually be obscured by rainy or snowy weather conditions.

In the example case where the vehicle 200 is able to identify rainy conditions, for example, based on input from a rain sensor, an indication that the windshield wipers are operating, or external weather reports available to the computing device 100, the vehicle position optimizer 122 can lower the weight given to a comparison made between horizontal space features such as lane markings and increase the weight given to a comparison made between vertical space features such as signs and poles. Similarly, if the vehicle 200 is operating in snowy conditions, the vehicle position optimizer 122 can make a comparison to the geographic feature map 400 using only certain types of horizontal space features, such as curbs 316, 318, in addition to vertical space features, such as street signs 320, 322 and lamp poles 324, 326, completely ignoring any horizontal space lane markings in making the comparison since these features could be completely obscured by snow. If additional horizontal space features, such as curbs 316, 318, are also obscured by snow, the vehicle position optimizer 122 can also ignore these geographic features in making the comparison to the geographic feature map 400.

In addition to weather conditions such as rain and snow affecting the comparison between currently captured and map-based geographic features, there are other external conditions possible that would require the use of geographic feature weighting. For example, road construction conditions could adversely affect the comparison between currently captured geographic features and those features saved within the geographic feature map by changing the position of lane markings, removing lane edge features, or adding additional vertical space features such as traffic barrels. The vehicle position optimizer 122 could be configured to change the weights of some horizontal space features (e.g. lane markings) when construction is identified and to ignore additional vertical space features (e.g. traffic barrels) that are not present on the geographic feature map. The examples given for rain, snow, and construction are only illustrations, many other environmental conditions could be identified that would affect the weightings given to various geographic features based on space association.

Geographic feature weighting can also be used during the comparison of currently captured geographic features to geographic features present in a geographic feature map based on geophysical location association or shape association. For example, in foggy environmental conditions, geographic features closer in geophysical location to the vehicle 200 can be given a higher weighting than those further away from the vehicle 200. In another example of rainy environmental conditions, geographic features with cylindrical or planar shape associations can be given a higher weighting than those having linear shape associations. When applying weights to geographic features, at least two categories of a given type of geographic feature should be present to distinguish the weights between the categories. For example, to give a higher weight to geographic features having a vertical space association, geographic features having a horizontal space association should also be present that receive a lower weight. In addition, the geographic feature map should include at least two types of information associated with each geographic feature in order to make an accurate comparison during operation 506. The various types of information can include geophysical location association, shape association, space association, and intensity value association.

At operation 508, a localized vehicle position can be generated based on the weighted comparison of the currently captured geographic features to the geographic features present within the geographic feature map. Generating the localized vehicle position can include applying various filtering methods using the vehicle position optimizer 122. In one example, particle filtering can be used to refine the currently captured geographic features before making the comparison to the geographic features present in the geographic feature map and generating the localized vehicle position based on the comparison. Generating the localized vehicle position can also include an assumption that the current localized vehicle position is proximate to a recently calculated localized vehicle position, that is, the process 500 is iterative in its update. After operation 508, the process 500 ends.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An automated driving system, comprising:
   one or more sensors disposed on a vehicle; and
   a computing device in communication with the one or more sensors, comprising:
      one or more processors for controlling the operations of the computing device; and
      a memory for storing data and program instructions used by the one or more processors, wherein the one or more processors are configured to execute instructions stored in the memory to:
         identify one or more geographic features, and whether each of the one or more geographic features is in a physical space along a ground plane or in a physical space above the ground plane, based on the information received from the one or more sensors as the vehicle traverses a route;
         for each of the one or more geographic features, associate it with a horizontal space if it is identified in the physical space along the ground plane, and with a vertical space if it is identified in the physical space above the ground plane;
         compare each of the one or more geographic features to a geographic feature map representing the route and including previously recorded geographic features to identify matches between each of the one or more geographic features and respective previously recorded geographic features along the route;
         give each of the comparisons between each of the one or more geographic features and the geographic feature map a weight based at least in part on the space association of its respective of the one or more geographic features; and
         generate a localized vehicle position based on the weighted comparisons between the one or more geographic features and the geographic feature map.

2. The system of claim 1, wherein the one or more geographic features include at least one horizontal space geographic feature in the physical space along the ground plane and at least one vertical space geographic feature in the physical space above the ground plane.

3. The system of claim 1, wherein the one or more geographic features include lane markings and lane edge features in the physical space along the ground plane and signs and poles and buildings and trees in the physical space above the ground plane.

4. The system of claim 1, wherein the one or more processors are further configured to:
   associate at least one of a geophysical location and a shape with each of the one or more geographic features.

5. The system of claim 4, wherein the weight given to each of the comparisons between each of the one or more geographic features and the geographic feature map is further based at least in part on the at least one of the geophysical location association and the shape association of its respective of the one or more geographic features.

6. The system of claim 1, wherein the one or more processors are further configured to:
   associate intensity values from the information from the one or more sensors with each of the one or more geographic features.

7. The system of claim 1, wherein the geographic feature map includes at least two of a geophysical location association and a shape association and an intensity value association and a space association for each of the respective previously recorded geographic features.

8. A computer-implemented method of automated driving, comprising:
   receiving information from one or more sensors disposed on a vehicle as the vehicle traverses a route; and
   with one or more processors:
      identify one or more geographic features, and whether each of the one or more geographic features is in a physical space along a ground plane or in a physical space above the ground plane, based on the information received from the one or more sensors;
      for each of the one or more geographic features, associate it with a horizontal space if it is identified in the physical space along the ground plane, with a vertical space if it is identified in the physical space above the ground plane;
      compare each of the one or more geographic features to a geographic feature map representing the route and including previously recorded geographic features to identify matches between each of the one or more geographic features and respective previously recorded geographic features along the route;
      give each of the comparisons between each of the one or more geographic features and the geographic feature map a weight based at least in part on the space association of its respective of the one or more geographic features; and
      generate a localized vehicle position based on the weighted comparisons between the one or more geographic features and the geographic feature map.

9. The method of claim 8, wherein the one or more geographic features include at least one horizontal space geographic feature in the physical space along the ground plane and at least one vertical space geographic feature in the physical space above the ground plane.

10. The method of claim 8, wherein the one or more geographic features include lane markings and lane edge features in the physical space along the ground plane and signs and poles and buildings and trees in the physical space above the ground plane.

11. The method of claim 8, further comprising:
with the one or more processors:
associating at least one of a geophysical location and a shape with each of the one or more geographic features.

12. The method of claim 11, wherein the weight given to each of the comparisons between each of the one or more geographic features and the geographic feature map is further based at least in part on the at least one of the geophysical location association and the shape association of its respective of the one or more geographic features.

13. The method of claim 8, further comprising:
with the one or more processors:
associating intensity values from the information from the one or more sensors with each of the one or more geographic features.

14. The method of claim 8, wherein the geographic feature map includes at least two of a geophysical location association and a shape association and an intensity value association and a space association for each of the respective previously recorded geographic features.

15. A computing device, comprising:
one or more processors for controlling the operations of the computing device; and
a memory for storing data and program instructions used by the one or more processors, wherein the one or more processors are configured to execute instructions stored in the memory to:
identify one or more geographic features, and whether each of the one or more geographic features is in a physical space along a ground plane or in a physical space above the ground plane, based on information received from one or more sensors disposed on a vehicle as the vehicle traverses a route;
for each of the one or more geographic features, associate it with a horizontal space if it is identified in the physical space along the ground plane, and with a vertical space if it is identified in the physical space above the ground plane;
compare each of the one or more geographic features to a geographic feature map representing the route and including previously recorded geographic features to identify matches between each of the one or more geographic features and respective previously recorded geographic features along the route;
give each of the comparisons between each of the one or more geographic features and the geographic feature map a weight based at least in part on the space association of its respective of the one or more geographic features; and
generate a localized vehicle position based on the weighted comparisons between the one or more geographic features and the geographic feature map.

16. The device of claim 15, wherein the one or more geographic features include lane markings and lane edge features in the physical space along the ground plane and signs and poles and buildings and trees in the physical space above the ground plane.

17. The device of claim 15, wherein the one or more processors are further configured to:
associate at least one of a geophysical location and a shape with each of the one or more geographic features.

18. The device of claim 17, wherein the weight given to each of the comparisons between each of the one or more geographic features to and the geographic feature map is further based at least in part on the at least one of the geophysical location association and the shape association of its respective of the one or more geographic features.

19. The device of claim 15, wherein the one or more processors are further configured to:
associate intensity values from the information from the one or more sensors with each of the one or more geographic features.

20. The device of claim 15, wherein the geographic feature map includes at least two of a geophysical location association and a shape association and an intensity value association and a space association for each of the respective previously recorded geographic features.

* * * * *